United States Patent

Kitan

(10) Patent No.: US 9,671,719 B2
(45) Date of Patent: Jun. 6, 2017

(54) LAYER THICKNESS RESTRICTION MEMBER, DEVELOPMENT DEVICE, PROCESS CARTRIDGE, AND METHOD FOR MANUFACTURING LAYER THICKNESS RESTRICTION MEMBER

(71) Applicant: CANON KABUSHIKI KAISHA, Tokyo (JP)

(72) Inventor: Tomonori Kitan, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/645,279

(22) Filed: Mar. 11, 2015

(65) Prior Publication Data

US 2015/0261128 A1    Sep. 17, 2015

(30) Foreign Application Priority Data

Mar. 14, 2014 (JP) .................... 2014-051908

(51) Int. Cl.
G03G 15/00 (2006.01)
G03G 15/08 (2006.01)
B29C 45/00 (2006.01)
B29L 31/00 (2006.01)

(52) U.S. Cl.
CPC ..... *G03G 15/0812* (2013.01); *B29C 45/0025* (2013.01); *B29C 45/0046* (2013.01); *B29C 2045/0027* (2013.01); *B29L 2031/772* (2013.01)

(58) Field of Classification Search
CPC ....... G03G 15/0812; G03G 2215/0805; G03G 15/0921; G03G 15/09; G03G 15/0877; B29C 45/0017; B29L 2031/772

USPC .......... 399/111, 119, 264, 274, 284
See application file for complete search history.

(56) References Cited

U.S. PATENT DOCUMENTS

| | | | | |
|---|---|---|---|---|
| 6,528,158 B1* | 3/2003 | Kuroda | ............. | G03G 15/0812 399/284 |
| 2002/0037179 A1* | 3/2002 | Suzuki | ............. | B29C 45/0062 399/111 |
| 2007/0253750 A1* | 11/2007 | Okamoto | ........... | G03G 15/0812 399/284 |
| 2009/0245851 A1* | 10/2009 | Hoshi | ............... | G03G 15/0812 399/103 |
| 2011/0286762 A1* | 11/2011 | Hoshi | ............... | G03G 15/0894 399/103 |
| 2013/0236216 A1* | 9/2013 | Innami | ............. | G03G 15/0921 399/277 |

FOREIGN PATENT DOCUMENTS

| JP | 2002-214886 A | 7/2002 |
|---|---|---|
| JP | 2009-175360 A | 8/2009 |
| JP | 2014-2204 A | 1/2014 |

* cited by examiner

*Primary Examiner* — Walter L Lindsay, Jr.
*Assistant Examiner* — Jessica L Eley
(74) *Attorney, Agent, or Firm* — Canon U.S.A. Inc., IP Division

(57) ABSTRACT

A layer thickness restriction portion and a developer rectifying portion are formed integrally by injecting a resin material into a mold, in which a gate portion is offset to one side with respect to a center position of the layer thickness restriction portion, through the gate portion.

6 Claims, 11 Drawing Sheets

LAYER THICKNESS RESTRICTION MEMBER, DEVELOPMENT DEVICE, PROCESS CARTRIDGE, AND METHOD FOR MANUFACTURING LAYER THICKNESS RESTRICTION MEMBER

BACKGROUND

Field of the Invention

The present disclosure relates to a layer thickness restriction member in which a layer thickness restriction portion that restricts a layer thickness of a developer carried by a developer carrier, an upstream-side opposing portion and a downstream-side opposing portion that oppose the developer carrier, and reinforcing ribs arranged on a rear side of the layer thickness restriction portion are integrally molded with resin.

Description of the Related Art

Image forming devices that include a development device that develops an electrostatic image on an image carrier into a toner image by using a toner are widely used. The development device restricts a layer thickness of a developer magnetically carried on a rotating developer carrier to a uniform layer thickness with a layer thickness restriction member fixed to the development device.

The layer thickness restriction member is typically configured so that a blade member that restricts a layer thickness of a developer carried on a developer carrier is attached, so as to be capable of adjusting a clearance, to a support member that is disposed in the development device so as to be parallel to the developer carrier. However, in order to reduce the number of parts and to facilitate adjustment of the clearance between the opposing blade member and the developer carrier, integration of the support member and the blade member is awaited.

Japanese Patent Laid-Open No. 2002-214886 (Patent Literature 1) sets forth a layer thickness restriction member in which a support member and a blade member are integrally formed by press working a stainless plate. Japanese Patent Laid-Open No. 2009-175360 (Patent Literature 2) sets forth a layer thickness restriction member provided with a reinforcement structure of a blade member in a middle portion of a developer carrier in a rotational axis direction.

As illustrated in FIGS. 3 and 4, a layer thickness restriction member (37) in which a layer thickness restriction portion (36) that restricts a layer thickness of a developer, an upstream-side opposing portion (35) that opposes the developer carrier, and reinforcing ribs (38) that are arranged on the rear side of the layer thickness restriction portion are integrally formed using resin has been proposed. Moreover, when a layer thickness restriction member integrally formed with resin was fabricated by way of trial by injection molding, a bend was formed in the layer thickness restriction member in which the center portion of the layer thickness restriction member in the rotational axis direction of the developer carrier extended away from the developer carrier (see FIG. 8B).

Thereupon, a modification in a direction opposite to the bend was performed in the mold for injection molding at a portion corresponding to the layer thickness restriction portion of the layer thickness restriction member so as to, while tolerating a bend of the overall layer thickness restriction member, at least prevent the bend to affect the surface of the layer thickness restriction portion opposing the developer carrier. However, after performing such modification to the mold, when a layer thickness restriction portion was fabricated by way of trial, it was found that the linearity of the layer thickness restriction portion was lost in the center area of the layer thickness restriction portion in the rotational axis direction of the developer carrier.

SUMMARY

The present disclosure provides a layer thickness restriction member in which linearity of a center area of a layer thickness restriction portion in a rotational axis direction of a developer carrier is improved and in which homogeneous distribution of a layer thickness in the rotational axis direction of a developer carried by the developer carrier is facilitated.

A layer thickness restriction member of the present disclosure includes a layer thickness restriction portion that restricts a layer thickness of a developer carried by a developer carrier, and an upstream-side opposing portion that opposes the developer carrier at a portion on an upstream side of the layer thickness restriction portion in a rotating direction of the developer carrier, in which the layer thickness restriction portion and the upstream-side opposing portion are integrally molded by a resin material and a position where an injection portion through which the resin material is injected when the layer thickness restriction portion and the upstream-side opposing portion are integrally molded is provided is only on one end side of the layer thickness restriction member in a rotational axis direction of the developer carrier.

Further features of the present invention will become apparent from the following description of exemplary embodiments with reference to the attached drawings.

DESCRIPTION OF THE EMBODIMENTS

Hereinafter, embodiments of the present disclosure will be described in detail with reference to the drawings.

First Exemplary Embodiment

Image Forming Device

Figure 1:
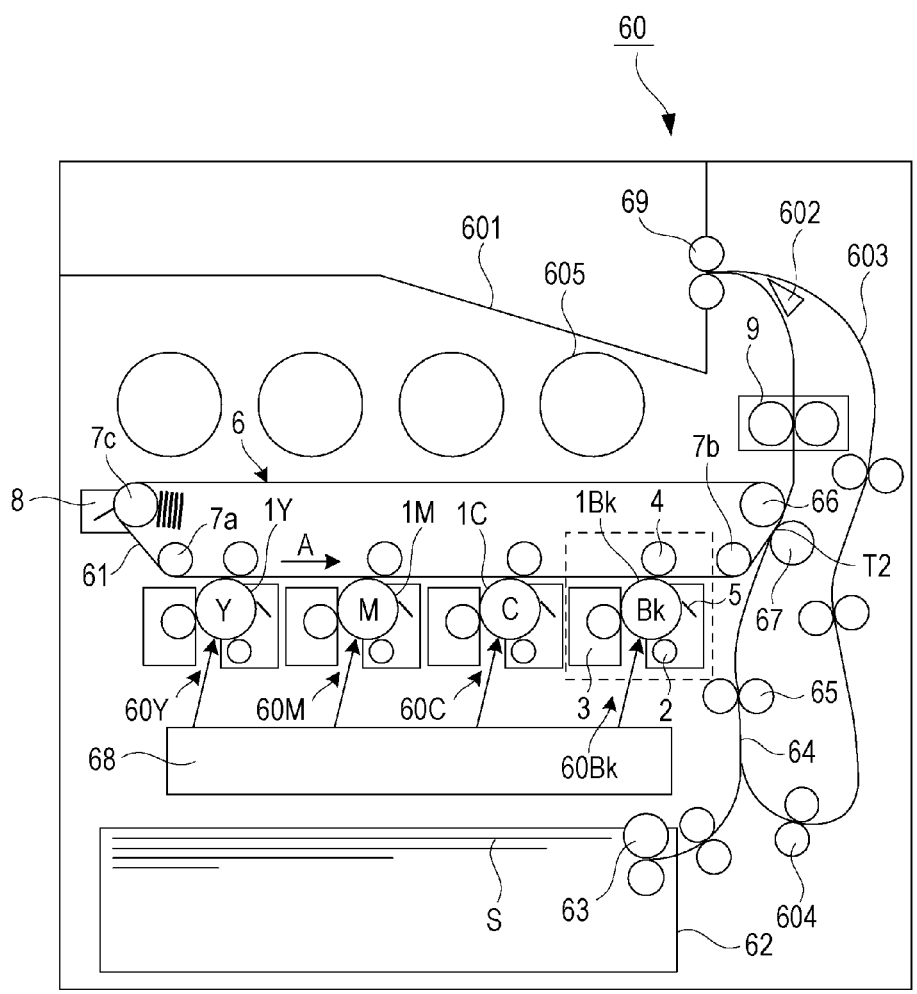
FIG. 1 is a drawing for describing a configuration of an image forming device.

FIG. 1 is a drawing for describing a configuration of an image forming device. As illustrated in FIG. 1, an image forming device 60 is a full color printer employing a tandem intermediate transfer system in which image forming portions 60Y, 60M, 60C, and 60Bk that are each integrated into a process cartridge are arranged along a downward facing surface of an intermediate transfer belt 61.

In the image forming portion 60Y, a yellow toner image is formed on a photosensitive drum 1Y and is transferred to the intermediate transfer belt 61. In the image forming portion 60M, a magenta toner image is formed on a photosensitive drum 1M and is transferred to the intermediate transfer belt 61. In the image forming portions 60C and 60Bk, a cyan toner image and a black toner image, respectively, are formed on photosensitive drums 1C and 1Bk, respectively, and are transferred to the intermediate transfer belt 61.

The toner image with four colors that has been transferred to the intermediate transfer belt 61 is conveyed to the secondary transfer portion T2 and a secondary transfer is performed on a recording medium S. A separation roller 63 separates the recording mediums S, which have been drawn out from a recording medium cassette 62, into separate sheets and sends the sheet to a registration roller 65. The registration roller 65 sends the recording medium S to the secondary transfer portion T2 while matching the timing with the toner image of the intermediate transfer belt 61. The recording medium S onto which the toner image with four colors has been secondarily transferred receives heat and pressure in a fixing device 9 so that the toner image is fixed to the surface of the recording medium S.

The image forming portions 60Y, 60M, 60C, and 60Bk are configured substantially in the same manner except that the colors of the toners that are used in development devices 3 of the image forming portions 60Y, 60M, 60C, and 60Bk are different from each other. Hereinafter, a description of the image forming portion 60Bk will be given and repeated descriptions of the other image forming portions 60Y, 60M, and 60C will be omitted.

In the image forming portion 60Bk, a charger 2, an exposing device 68, the development device 3, a transfer roller 4, and a drum cleaning device 5 are disposed so as to surround the photosensitive drum 1Bk. The photosensitive drum 1Bk includes an aluminum cylinder in which a photoconductive layer is formed on an outer peripheral surface thereof and rotates at a predetermined process speed.

The charger 2 applies an oscillation voltage, which is an AC voltage superimposed on a DC voltage having negative polarity, onto a charging roller so as to charge the photosensitive drum 1Bk with a uniform and negative electric potential. The exposing device 68 writes an electrostatic image of the image on the surface of the photosensitive drum 1Bk by scanning a laser beam, which is a scanning line image signal of the expanded image of each color on which on/off modulation has been performed, with a rotary mirror. The development device 3 transfers the toner to the photosensitive drum 1Bk to develop the electrostatic image into a toner image. An amount of new toner corresponding to the amount of the toner that has been consumed while forming the image in the development device 3 is supplied to the development device 3 from a toner cartridge 605 through a toner conveying path (not shown).

The transfer roller 4 presses the intermediate transfer belt 61 and forms a transfer portion between the photosensitive drum 1Bk and the intermediate transfer belt 61. By applying a DC voltage with a positive polarity to the transfer roller 4, the toner image with a negative polarity that has been carried by the photosensitive drum 1Bk is transferred to the intermediate transfer belt 61. The drum cleaning device 5 rubs a cleaning blade against the photosensitive drum 1Bk and removes the transfer residual toner adhered to the surface of the photosensitive drum 1Bk.

The intermediate transfer belt 61 is stretched over and supported by a tension roller 7c, a drive roller 66 that also serves as a secondary-transfer counter roller, and stretch rollers 7a and 7b, and is driven by the drive roller 66 so as to rotate in the arrow A direction. A secondary transfer roller 67 forms the secondary transfer portion T2 by abutting against the intermediate transfer belt 61 whose inside surface is supported by the drive roller 66. By applying a DC voltage with a positive polarity to the secondary transfer roller 67, the toner image on the intermediate transfer belt 61 is transferred to the recording medium S. A belt cleaning device 8 rubs a cleaning blade against the intermediate transfer belt 61 and collects the transfer residual toner on the surface of the intermediate transfer belt 61.

Development Device

Figure 2:
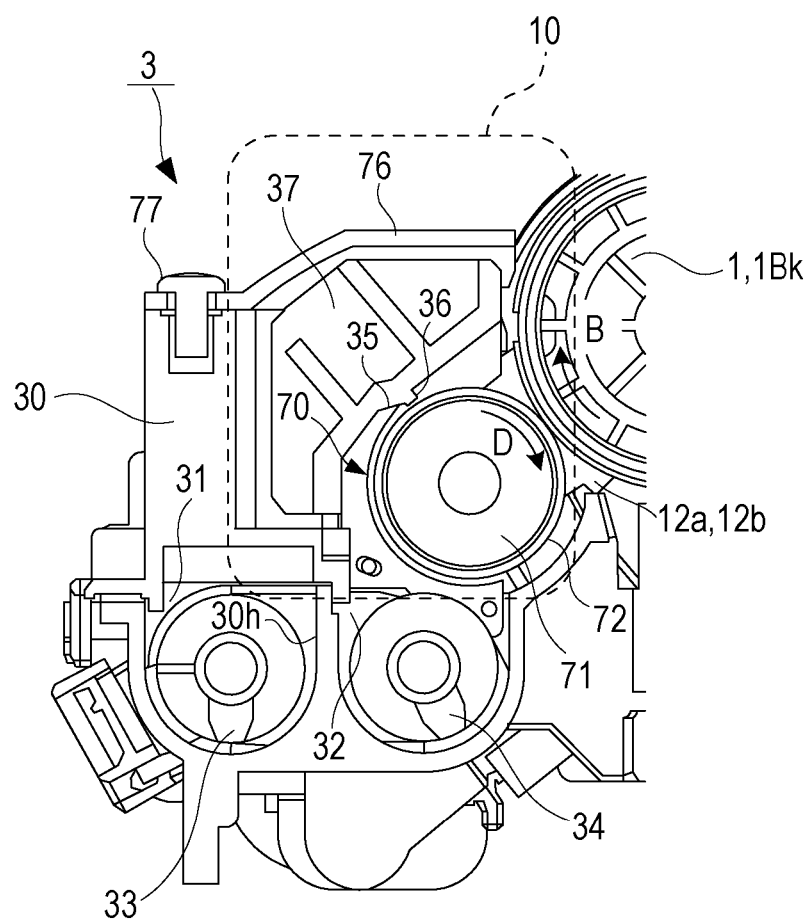
FIG. 2 is a drawing for describing a configuration of a development device.

FIG. 2 is a drawing for describing a configuration of a development device (a development portion of a process cartridge). As illustrated in FIG. 2, the development device 3 employs a two-component developing method that uses a two-component developer including a toner and a carrier. An inside of a developer container 30 is partitioned by a partition wall 30h into a first conveyance chamber 31 and a second conveyance chamber 32. The first conveyance chamber 31 and the second conveyance chamber 32 are connected to each other through opening portions (not shown) formed in the two end portions of the partition wall 30h in the longitudinal direction so as to form a circulation passage of a developer.

A first conveying screw 33 is rotatably disposed in the first conveyance chamber 31. A second conveying screw 34 is rotatably disposed in the second conveyance chamber 32. The rotating first conveying screw 33 and the second conveying screw 34 convey the developer in opposite directions such that the developer is circulated between the first conveyance chamber 31 and the second conveyance chamber 32 while being stirred.

A developer (two-component developer) containing 8 to 12% of toner by weight and about 90% of carrier by weight is stored inside the developer container 30. In the course of being conveyed through the first conveyance chamber 31, the toner and the carrier of the developer are sufficiently stirred together and are frictionally charged such that the carrier is charged positively and the toner is charged negatively. A development sleeve 70 is disposed in the second conveyance chamber 32 in a parallel manner with respect to the second conveying screw 34. The second conveying screw 34 conveying the developer of the second conveyance chamber 32 supplies the developer to the development sleeve 70.

In the development sleeve 70, a non-rotating magnet 71 that is arranged with a plurality of magnetic poles on the peripheral surface thereof is disposed inside a sleeve tube 72 that is a thin walled circular aluminum tube and that rotates in an arrow D direction. The magnet 71 forms a desired magnetic field at each phase position on the surface of the sleeve tube 72 so that the sleeve tube 72 carries the developer.

The developer supplied from the second conveying screw 34 (the carrier carrying the toner by frictional charge) is carried on the surface of the development sleeve 70 due to the magnetic flux of the magnet 71 and is conveyed in the arrow D direction. Although a rotation direction D of the development sleeve 70 is set so as to counter a rotation direction B of a photosensitive drum 1, the rotation direction thereof may be set in a with-direction.

Since the magnetic pole of the magnet 71 is arranged where the photosensitive drum 1 and the development sleeve 70 oppose each other, at the opposed position, the carrier carrying the toner stands up becoming a magnetic brush and rubs the surface of the photosensitive drum 1. In the above state, by applying an oscillation voltage, which is an AC voltage superimposed on a DC, onto the development sleeve 70, the toner is transferred to the photosensitive drum 1 and the electrostatic image of the photosensitive drum 1 is developed into a toner image.

A sleeve holder frame 37 that is an example of a layer thickness restriction member is disposed so as to oppose the development sleeve 70 on the upstream side of the position opposing the photosensitive drum 1 in the rotation direction of the development sleeve 70. The sleeve holder frame 37 is a member in which a developer rectifying portion 35 that becomes a guide when the development sleeve 70 conveys the developer and a layer thickness restriction portion 36 that restricts the layer thickness of the developer carried by the development sleeve 70 are integrally formed with a resin material. The developer rectifying portion 35 and the layer thickness restriction portion 36 are integrally configured as shapes included in the resin molded sleeve holder frame 37.

Since a magnetic pole of the magnet 71 is arranged where the layer thickness restriction portion 36 and the development sleeve 70 oppose each other, at the position where the two oppose each other, the carrier carrying the toner stands up becoming a magnetic brush and the length of the magnetic brush is cut with the layer thickness restriction portion 36 so as to have a uniform length equivalent to the length of the clearance between the opposing two.

Sleeve Holder Frame

Figure 3:
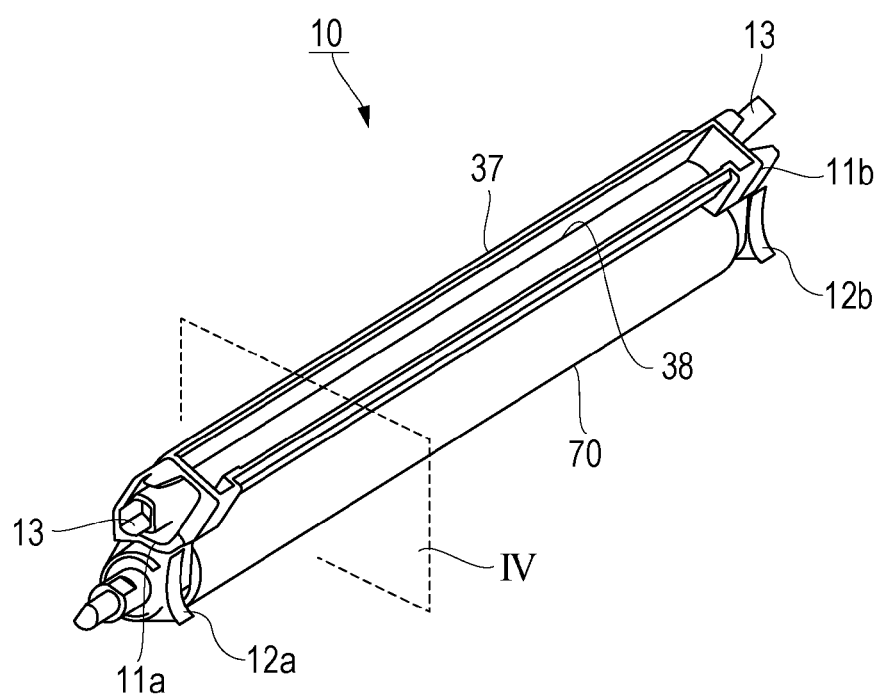
FIG. 3 is a perspective view of a development sleeve unit.
Figure 4:
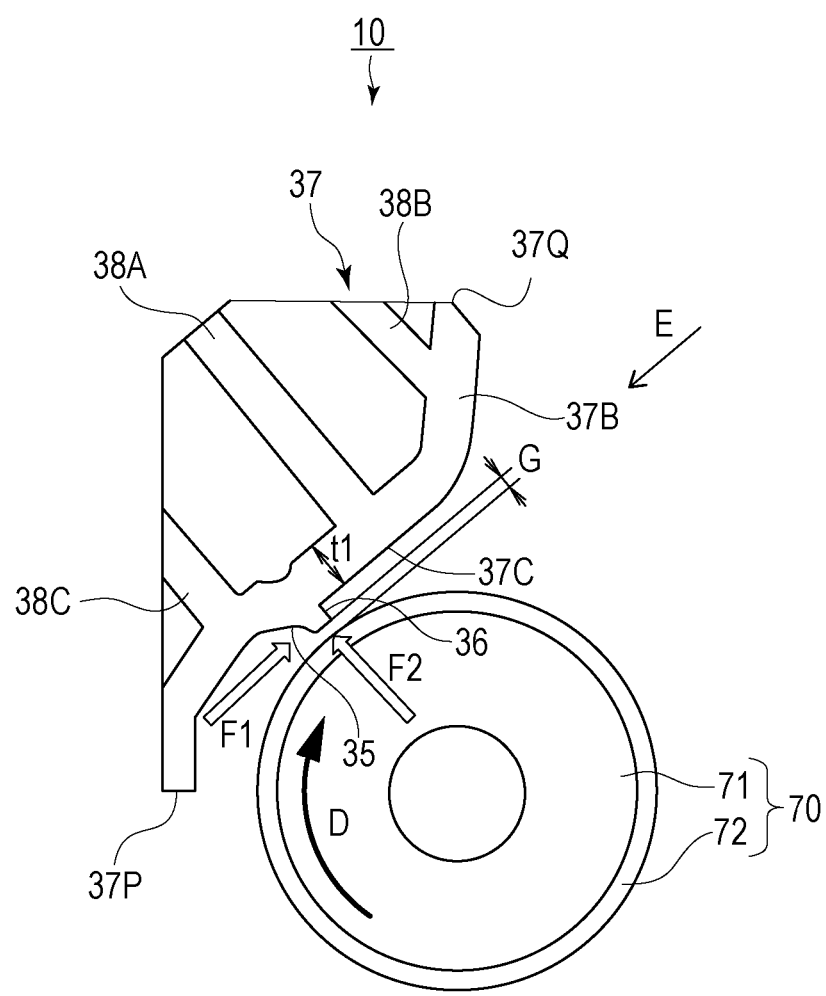
FIG. 4 is a cross-sectional view of a sleeve holder frame.

FIG. 3 is a perspective view of a development sleeve unit. FIG. 4 is a cross-sectional view of a sleeve holder frame.

As illustrated in FIG. 3, the sleeve holder frame 37 is a support member of the development sleeve 70 that is disposed between sleeve bearing members 11a and 11b. The development sleeve 70 is a developer carrier that carries a developer and that develops an electrostatic image of the photosensitive drum 1. The sleeve bearing members 11a and 11b are pivotally supporting portions of the development sleeve 70. The sleeve bearing members 11a and 11b support the shaft protruding from both ends of the development sleeve 70 through bearing members such as sintered bearings.

A development sleeve unit 10 is a replacement unit in which the sleeve bearing members 11a and 11b are fixed to the two end portions of the sleeve holder frame 37 and that rotatably support the development sleeve 70 (the sleeve tube 72) with the sleeve bearing members 11a and 11b. The orientation and position of the development sleeve unit 10 with respect to the developer container 30 is fixed with positioning shafts 13 included in the sleeve bearing members 11a and 11b. A section IV of the sleeve holder frame 37 is illustrated in FIG. 4.

As illustrated in FIG. 4, the sleeve holder frame 37 includes the layer thickness restriction portion 36 and the developer rectifying portion 35 and is a member that is integrally formed by injection molding with a resin material. A material such as PC-AS or PC-ABS that has a relatively high rigidity is selected for the resin material used as the sleeve holder frame 37.

The sleeve holder frame 37 includes a base surface 37B configured with a basic wall thickness of t1, a plurality of reinforcing ribs 38A, 38B, and 38C, and the layer thickness restriction portion 36 provided on an inner surface side (on the opposing surface side of the development sleeve 70) of the base surface 37B. The plurality of reinforcing ribs 38A, 38B, and 38C are provided on the rear side (the side opposite to the development sleeve 70) of the base surface 37B. The developer rectifying portion 35 is a portion on the upstream side of the base surface 37B that adjoins the layer thickness restriction portion 36. The developer rectifying portion 35 and the layer thickness restriction portion 36 are disposed on the surface of the base surface 37B that opposes the development sleeve 70.

In the development sleeve unit 10, an SB gap G is defined by the proximate portion between the layer thickness restriction portion 36 and the development sleeve 70. As illustrated in FIG. 3, adjustment of the SB gap G is performed by moving the overall position of the sleeve holder frame 37 with respect to the sleeve bearing members 11a and 11b. For example, as illustrated in FIG. 4, the development sleeve unit 10 is assembled in an integral manner by fixing the sleeve holder frame 37 with respect to the sleeve bearing members 11a and 11b after confirming with a camera or the like from the arrow E direction that the value of the SB gap G has entered a desired range.

A screw or the like may be used in fixing the sleeve holder frame 37 with respect to the sleeve bearing members 11a and 11b. However, since the sleeve holder frame 37 and the sleeve bearing members 11a and 11b are all formed of resin materials, methods such as laser welding and UV bonding may be selected so as to rid of torsion, misalignment, and the like that are accompanied while fixing with the screw and to enable assembly errors to be minimized.

As described above, in FIG. 3, the sleeve bearing members 11a and 11b that are an example of a pair of support members are fixed to both ends of the sleeve holder frame 37. The development sleeve 70 is rotatably supported by the pair of sleeve bearing members 11a and 11b.

As illustrated in FIG. 4, the layer thickness restriction portion 36 of the sleeve holder frame 37 restricts the layer thickness of the developer carried by the development sleeve 70 that is an example of a developer carrier. The developer rectifying portion 35 that is an example of an upstream-side opposing portion opposes the development sleeve 70 at a portion upstream of the layer thickness restriction portion 36 in the rotating direction of the development sleeve 70. A downstream-side opposing portion opposes the development sleeve 70 at a portion downstream of the layer thickness restriction portion 36. The reinforcing ribs 38A, 38B, and 38C protrude to the opposite side of the layer thickness restriction portion 36 along the layer thickness restriction portion 36 from at least either one of the developer rectifying portion 35 and the downstream-side opposing portion.

EXAMPLES

First Example

A position of a gate 50 that is a feature part of the present disclosure will be described. The present disclosure worked out a position of the gate 50 where the resin is injected when performing injection molding, in order to improve the linearity of the sleeve holder frame after the molding. In the present example, in forming the sleeve holder frame by injection molding, the position where the resin was injected (the position of the gate 50) was shifted towards one of the end portion side of the sleeve holder frame in the longitudinal direction. Furthermore, the sleeve holder frame was configured so as to be formed by injection molding with a single gate. Detailed description will be given below.

Figure 5:
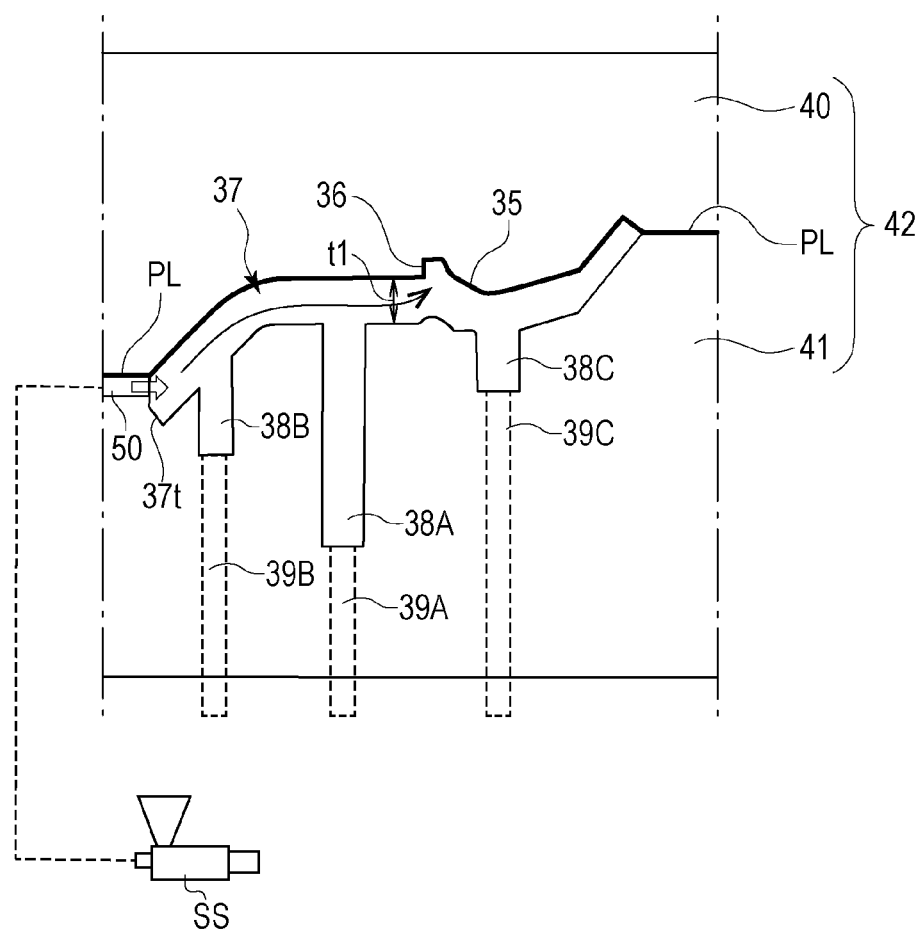
FIG. 5 is a drawing for describing a configuration of a mold that molded the sleeve holder frame.
Figure 6A:
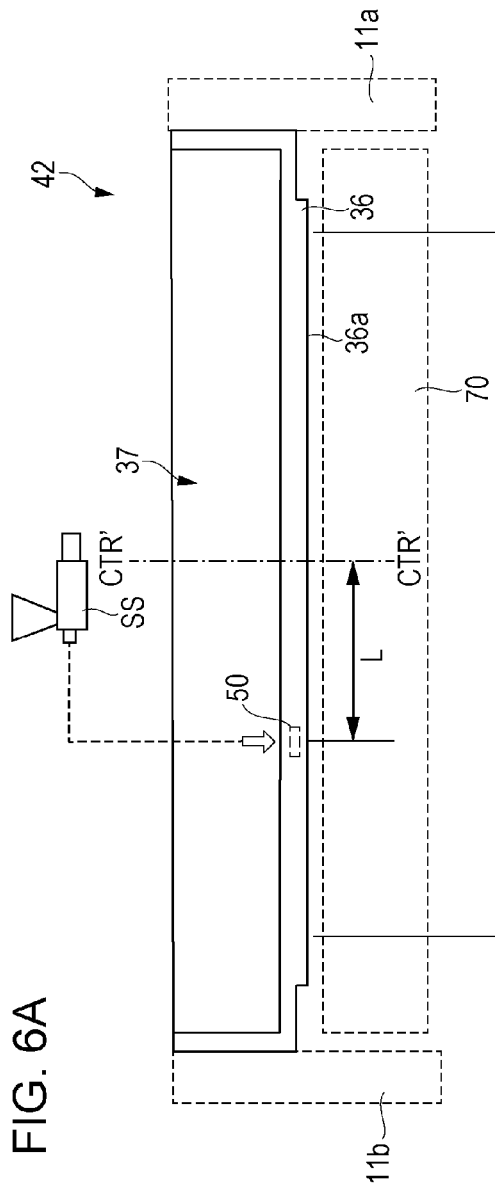
FIGS. 6A and 6B are drawing for describing a position of a gate in a mold of a first example.
Figure 6B:
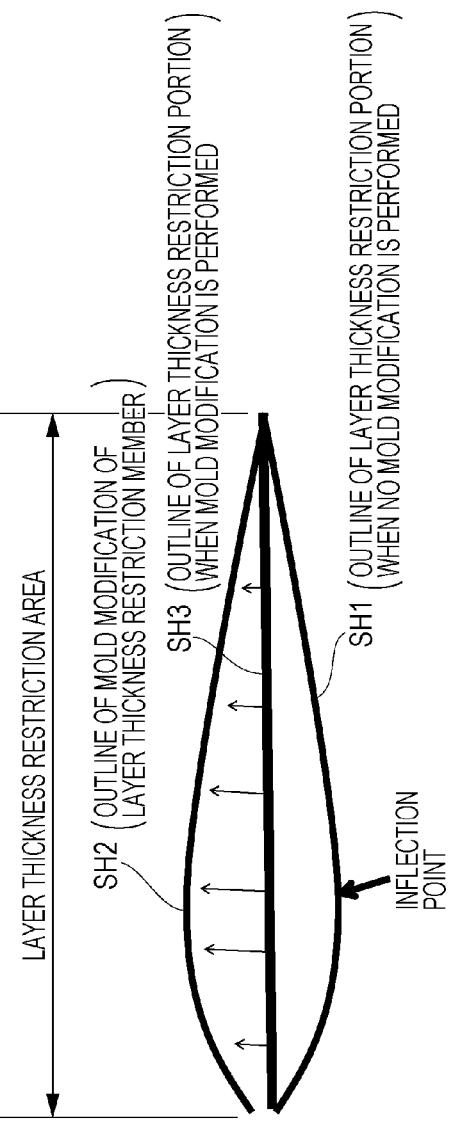
Figure 7:
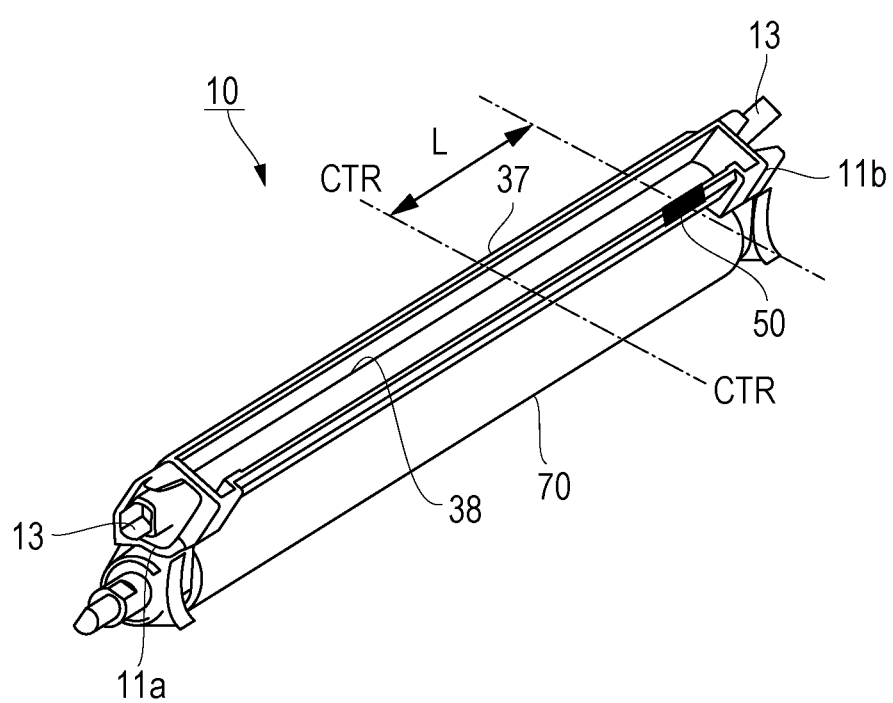
FIG. 7 is a perspective view of the sleeve holder frame that had been formed by injection molding.

FIG. 5 is a drawing for describing a configuration of a mold that molded the sleeve holder frame. FIGS. 6A and 6B are drawings for describing the position of the gate in the mold of the first example. FIG. 7 is a perspective view of a sleeve holder frame that had been formed by injection molding. In the first example, the gate was provided at a position that corresponds to the position of the end face 37P of the developer rectifying portion 35 or the end face 37Q of the downstream-side opposing portion (37B) of the sleeve holder frame 37 illustrated in FIG. 4.

As illustrated in FIG. 2, in the development device 3, in order to prevent uneven image density from occurring, a straightness of the layer thickness restriction portion 36 in a direction of the rotational axis of the developer carrier was required to be 20 to 30 μm or under. Accordingly, the layer thickness restriction portion 36 of the sleeve holder frame 37 needed to be molded to have straightness with a remarkably high accuracy compared with those of normal resin molded products. In order to achieve such high accuracy, in the manufacturing method of the first example, a partial modification of the mold surface and an arrangement of the gate that is an example of an injection portion for injecting and filling a resin material into the mold when integrally molding the sleeve holder frame were worked out.

As illustrated in FIG. 5, in the manufacturing method of the first example, the sleeve holder frame 37, which is a resin integrally molded layer thickness restriction member, was molded by injection molding a resin material into a mold 42 from an injection molding device SS. A mold surface forming the developer rectifying portion 35 and the layer thickness restriction portion 36 was formed on a cavity side mold 40. A molding surface forming the base surface 37B configured with a basic wall thickness of t1 and the plurality of reinforcing ribs 38A, 38B, and 38C provided on the base surface 37B was formed on a core side mold 41.

After the injection molding process, ejector pins 39 that eject the top surfaces of the reinforcing ribs 38A, 38B, and 38C were disposed in the core side mold 41 in order to push and take out the sleeve holder frame 37 from the core side mold 41. The injection molding mold 42 was configured in the above manner so as to allow suppression of deformation during injection molding and while taking out the sleeve holder frame 37 to a minimum.

Furthermore, the gate 50 that injected and filled the resin material into the mold 42 was provided in an end face 37t of the sleeve holder frame 37 in the rotating direction of the developer carrier. The gate 50 injected the resin towards the layer thickness restriction portion 36 from a surface that was different from the surface including the developer rectifying portion 35 and the layer thickness restriction portion 36. With the above, unevenness in the filling pressure distribution in the layer thickness restriction portion 36 in the rotational axis direction of the developer carrier was made small and, accordingly, warp and deformation of the layer thickness restriction portion 36 in the rotational axis direction of the developer carrier was suppressed.

As illustrated in FIG. 6A, the gate 50 was provided at a position away from a center CTR' of the sleeve holder frame 37 by a distance L. Furthermore, the gate 50 was not provided at both sides of the center CTR' of the sleeve holder frame 37 so as to be set apart from the center CTR' by the distance L, but was provided on only one side. The trace of the gate was left in the sleeve holder frame 37 at a position that corresponds to the end portion of the developer carrying area in the rotational axis direction of the development sleeve 70.

As illustrated in FIG. 6B, a modification was performed in a distal end surface 36a of the layer thickness restriction portion 36 of the mold 42. In other words, regarding the surface of the mold 42, when the area corresponding to the distal end surface 36a of the layer thickness restriction portion 36 was a straight line, in an outline SH1 of the layer thickness restriction portion 36 of the sleeve holder frame 37 to which injection molding had been performed and that had been taken out, the portion corresponding to where the gate 50 was positioned protruded more towards the development sleeve 70 with respect to the two end portions. Accordingly, regarding the surface of the mold 42, a modification was performed so that in an outline SH2 that is an area corresponding to the layer thickness restriction portion 36, the gate 50 was positioned farther away from the development sleeve 70 with respect to the two end portions such that a peak was formed. With the above, an outline SH3 of the layer thickness restriction portion 36 of the sleeve holder frame 37 to which injection molding had been performed and that had been taken out from the mold 42 was formed in a linear manner.

Note that the distance L in which the gate 50 is biased towards the end portion side from the center CTR of the sleeve holder frame 37 is desirably an appropriate distance obtained through experiment while considering the fluidity of the resin material and the effect that is brought about in the improvement in the linear precision of the outline SH3 of the layer thickness restriction portion 36.

As illustrated in FIG. 7, the sleeve holder frame 37 of the first example on which injection molding had been performed and that had been taken out from the mold left a trace of the gate 50. The trace of the gate 50 was formed on one side of the sleeve holder frame 37 at a position away from the center CTR of the sleeve holder frame 37 by the distance L.

Referring to FIG. 7, the dimensions of the sleeve holder frame was 245 mm in length, 15 mm in width, and 20 mm in height. The layer thickness restriction area was 218 mm so as to correspond to a vertical feed of LTR size sheets. The distance L was 95 mm. In other words, the gate position was shifted 95 mm towards one end side from the center of the sleeve holder frame 37. The gate 50 had a rectangular shape of 10 mm×1.5 mm. In other words, the gate 50 was positioned 90 mm away from the center CTR-CTR of the sleeve holder frame 37 that had a full length of 245 mm.

Note that the position of the gate 50 from one end side of the sleeve holder frame 37 in the longitudinal direction is desirably in the range of 10% or more to under 40% of the full length of the sleeve holder frame 37 (60% or more to under 90% from the other end side). More desirably, the position of the gate 50 from one end side of the sleeve holder frame 37 is in the range of 10% or more to under 30% (70% or more to under 90% from the other end side).

If the position of the gate 50 were to be in the range of under 10% from one end side of the sleeve holder frame 37, the distance in filling the resin will become long. Accordingly, since a high injection pressure will be required and since a long filling time will be needed, a large effect will be disadvantageously exerted on the warp. Furthermore, if the position of the gate 50 were to be in the range of 40% or more to under 60% from one end side, as described below, since the injection pressure will concentrate on the center portion where rigidity in the longitudinal direction is small, a large effect will be disadvantageously exerted on the warp.

As described above, the mold surface in the mold that formed a developer carrier opposition surface of the layer thickness restriction portion 36 was, in the rotational axis direction, retreated such that the mold surface was, at a position of the gate that is an example of the injection portion, farthest away from the development sleeve 70. The gate in the mold was formed so as to be orthogonal to the rotational axis direction and extending towards the layer thickness restriction portion 36.

COMPARATIVE EXAMPLES

Figure 8A:
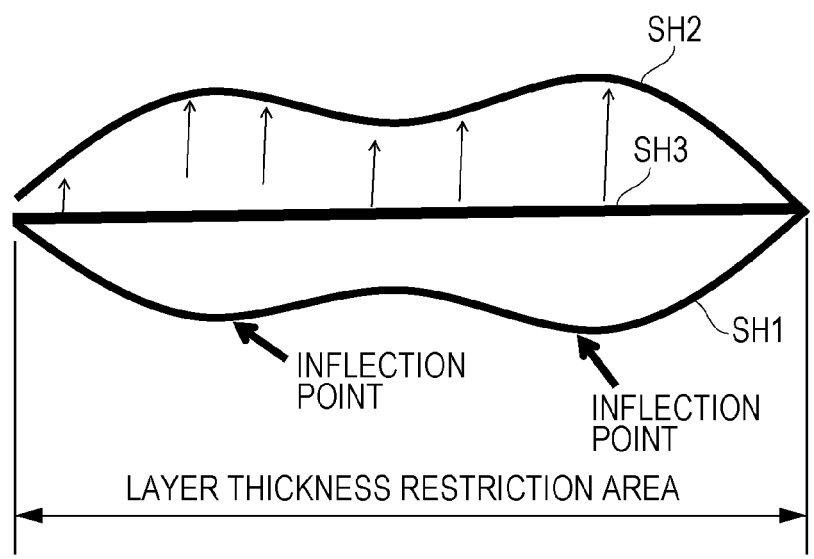
FIGS. 8A and 8B are each a drawing for describing a mold modification performed on a mold of a comparative example.
Figure 8B:
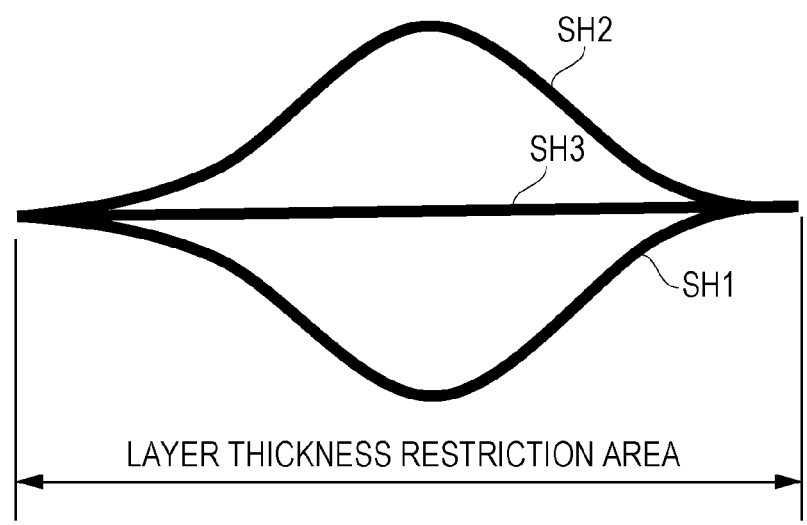

FIGS. 8A and 8B are each a drawing for describing a mold modification performed on a mold of a comparative example. As illustrated in FIG. 8A, in the mold of a first comparative example, two gates were provided in the mold of the sleeve holder frame 37. The gates 50 were provided in the mold 42 illustrated in FIG. 6 at symmetrical positions with the center CTR' therebetween. In the first comparative example, when the distal end surface 36a of the mold 42 was formed in a straight line, in an outline SH1 of the layer thickness restriction portion 36 of the sleeve holder frame 37 to which injection molding had been performed on and that had been taken out from the mold 42, two portions on the center side protruded towards the development sleeve 70 with respect to the two end portions. Accordingly, a modification was performed such that an outline SH2 of the layer thickness restriction portion 36 of the mold 42 was formed with two inflection points that extend away from the development sleeve 70 with respect to the two end portions. As a result, the modification of the distal end surface 36a of the mold 42 became intricate and ruffles were formed on the outline SH3 of the layer thickness restriction portion 36 of the sleeve holder frame 37 to which injection molding had been performed and that had been taken out; accordingly, it was confirmed that linearity was lower than that of the first example.

As illustrated in FIG. 8B, in the mold of a second comparative example, the gate in the mold of the sleeve holder frame 37 was provided at the center of the developer carrier in the rotational axis direction. In the mold 42 illustrated in FIG. 6, the gate 50 was provided at the center CTR position. In the second comparative example, when the distal end surface 36a of the mold 42 was formed in a straight line, in an outline SH1 of the layer thickness restriction portion 36 of the sleeve holder frame 37 to which injection molding had been performed and that had been taken out, the center protruded towards the development sleeve 70 with respect to the two end portions. Accordingly, a modification was performed such that an outline SH2 of the layer thickness restriction portion 36 of the mold 42 was formed so that the center portion extends away from the development sleeve 70 with respect to the two end portions so as to from a peak. As a result, a warp that was larger than that of the first example was formed throughout the entire sleeve holder frame 37 and linearity of the outline SH3 of the layer thickness restriction portion 36 was not sufficiently obtained.

Second Example

Figure 9:
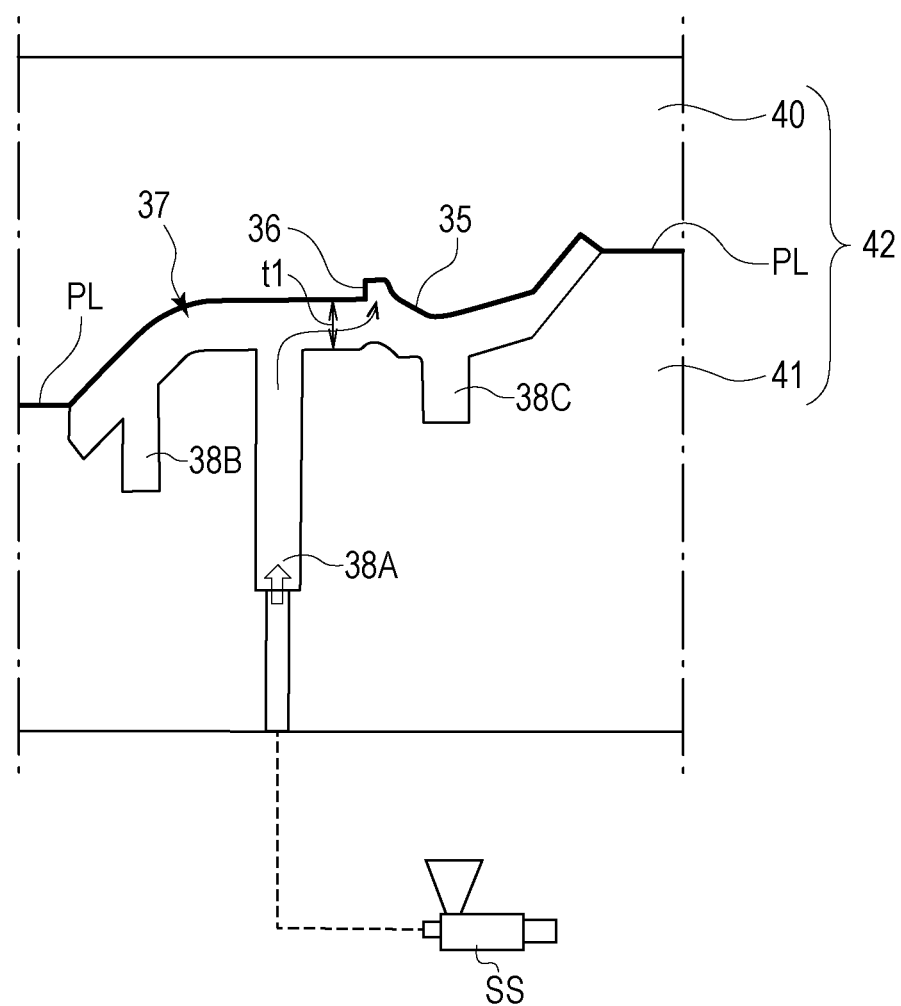
FIG. 9 is a drawing for describing a position of a gate in a mold of a second example.
Figure 10:
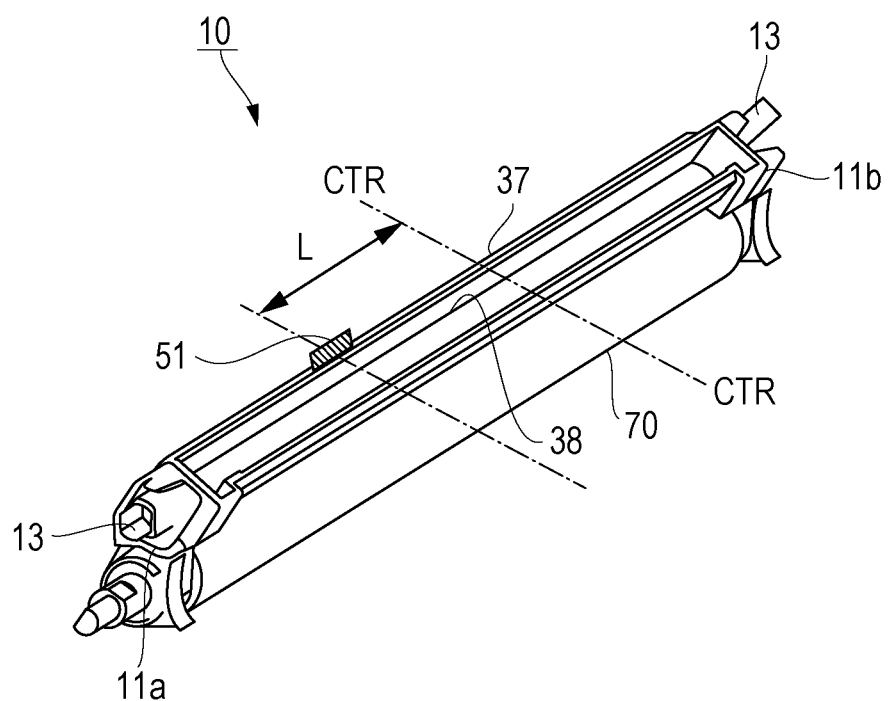
FIG. 10 is a perspective view of the sleeve holder frame that had been formed by injection molding.

FIG. 9 is a drawing for describing a position of a gate in a mold of a second example. FIG. 10 is a perspective view of a sleeve holder frame that had been formed by injection molding. In the second example, the trace of the gate was left on the distal end surface of the reinforcing rib 38A. The second example was different from the first example only in that the position of the gate was different. Accordingly, in FIG. 9, components that are the same as those of the first example are attached with the same reference numerals as those of FIG. 5 and repeated descriptions thereof will be omitted.

As illustrated in FIG. 9, in the mold 42 of the second example, a gate 51 was provided in the distal end surface of the reinforcing rib 38A provided on the surface on the opposite side of the surface including the layer thickness restriction portion 36. The gate 51 injecting resin towards the layer thickness restriction portion 36 reduced unevenness in the distribution of the injection pressure exerted on the layer thickness restriction portion 36 in the rotational axis direction of the developer carrier; accordingly, an effect of reduction in the warp of the sleeve holder frame 37 was obtained.

As illustrated in FIG. 10, the sleeve holder frame 37 of the second example on which injection molding had been performed and that had been taken out from the mold left a trace of the gate 51 on the distal end surface of the reinforcing rib 38A. The trace of the gate 51 was formed on one side at a position away from the center CTR of the sleeve holder frame 37 by the distance L.

Comparison with Conventional Process Cartridges

Figure 11:
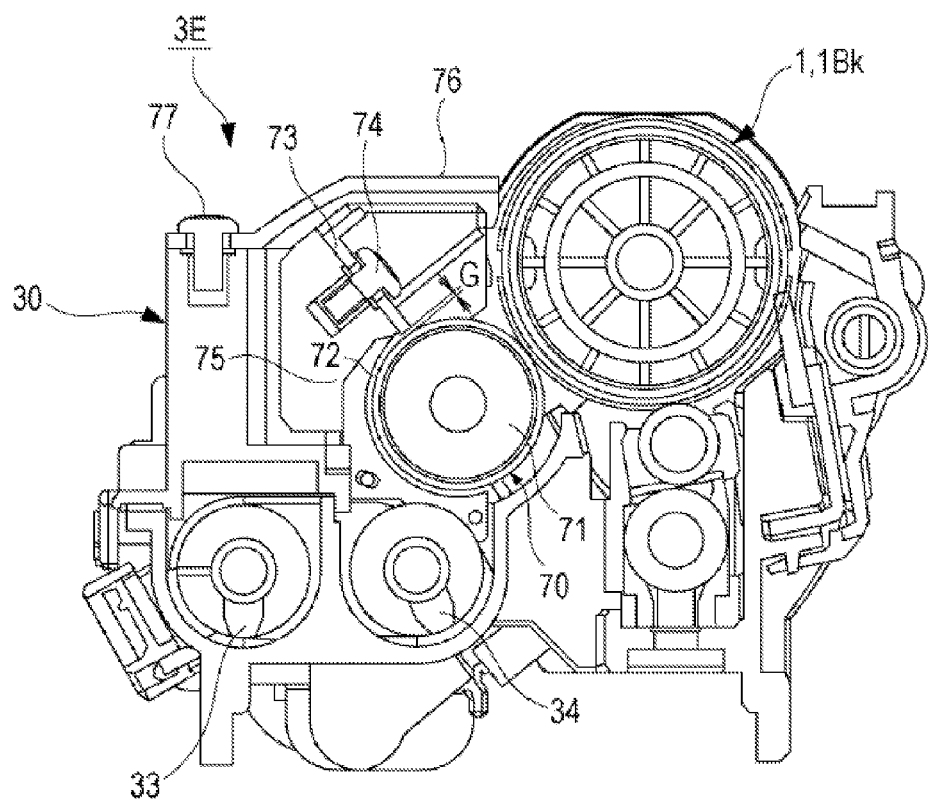
FIG. 11 is a drawing for describing a configuration of a conventional process cartridge.

FIG. 11 is a drawing for describing a configuration of a conventional process cartridge. As illustrated in FIG. 11, a development device 3E of the conventional process cartridge forms an SB gap G by having a doctor blade 73 fixed to a rectifying member 75 oppose the development sleeve 70. After the relative position between the doctor blade 73 and the rectifying member 75 is adjusted by adjustment screws 74, the doctor blade 73 is fastened and fixed while the SB gap G is set within a desired range of precision.

When fixing the doctor blade 73 to the rectifier member 75, adjustment work needs to be done while considering the amount of displacement after the adjustment screws 74 are fastened to a plurality of positions of the rectifying member 75; accordingly, much time and a complex adjusting tool are needed for the adjustment work. Furthermore, since the doctor blade 73 is formed of a metal material, metal powder coming off from the doctor blade 73 may be mixed into the developer on the development sleeve 70.

Conversely, in the first exemplary embodiment, since the sleeve holder frame 37 is integrally formed with a resin material, there is no room for metal powder to be created and a state in which the metal powder gets mixed into the developer can be averted.

Since a resin material has a high degree of freedom in molding, the layer thickness restriction portion 36 and the developer rectifying portion 35 can be molded from inexpensive resin; accordingly, a resin material is also desirable from the viewpoint of weight reduction and cost reduction of the development device 3.

Since a resin material is nonmagnetic, there is no concern of the sleeve holder frame 37 becoming bent by magnetic force of the magnet 71 accommodated in the development sleeve 70.

By configuring the base surface 37B and the layer thickness restriction portion 36 in an integrated manner, laboriousness related to adjustment of the SB gap G can be eliminated and intricate adjustment work that has been carried out in conventional members of the doctor blade 73 may be dispensed of.

Configuring the sleeve holder frame 37 in an integrated manner also has an advantage in that a large geometrical moment of inertia can be obtained by the reinforcing ribs 38A, 38B, and 38C achieving rigidity of the sleeve holder frame 37.

Although being inexpensive, a sleeve holder frame 37 that has high accuracy and high rigidity can be devised and a stable developer density with little variation can be obtained; accordingly, a development device and a process cartridge that can achieve stable image concentration can be provided.

Effects of the First Exemplary Embodiment

As described above, in the first exemplary embodiment, the layer thickness restriction portion 36 and the developer rectifying portion 35 are formed integrally by injecting a resin material into a mold, a gate of which is offset to one side with respect to the center position of the layer thickness restriction portion 36, through the gate. Accordingly, the sleeve holder frame 37 is integrally molded by injecting the resin material into the mold and is left with a trace of the gate, which filled the resin material into the mold, on only one side offset from the center position of the layer thickness restriction portion 36 in the rotational axis direction of the development sleeve 70.

Accordingly, the surface of the layer thickness restriction portion 36 opposing the development sleeve 70 is modified into a linear shape extending along the rotational axis line. However, since the overall sleeve holder frame 37 is bent towards the developer carrier side, the area of the developer rectifying portion 35 adjoining the layer thickness restriction portion 36 protrudes towards the developer carrier side, while the position where the trace of the gate is positioned reaches a peak.

In the first exemplary embodiment, by working out a configuration of the mold that molds the sleeve holder frame 37, warp of the layer thickness restriction portion 36 in the rotational axis direction of the developer carrier can be reduced. As illustrated in FIG. 4, owing to the reinforcing ribs 38A, 38B, and 38C, it has become possible to suppress the straightness of the layer thickness restriction portion 36 to 20 to 30 μm or under even when including the bend caused by force F1 and F2 generated through the developer and the warp caused by thermal deformation.

In the first exemplary embodiment, concentration of the injection pressure on the center portion of the sleeve holder frame 37 where rigidity in the longitudinal direction is low can be averted by providing the gate 50 away from the center CTR of the sleeve holder frame 37 by the distance L. Accordingly, warp of the sleeve holder frame 37 can be suppressed and the straightness accuracy of the layer thickness restriction portion 36 can be improved.

In the first exemplary embodiment, by providing the gate 50 at a single position, the inflection point of the warp of the layer thickness restriction portion 36 in the longitudinal direction can be provided at a single position; accordingly, it is relatively easy to perform a modification process of the warp of the layer thickness restriction portion 36 of the mold in the longitudinal direction. Accordingly, the straightness accuracy of the layer thickness restriction portion 36 can be improved.

In the first exemplary embodiment, since the developer rectifying portion and the layer thickness restriction portion are configured with high accuracy by injection molding using a resin material for molding, it has become possible to restrict, in a stable manner, the developer coated layer thickness to be uniform in the longitudinal direction of the development sleeve 70 and to maintain the image concentration in a stable manner.

Compared to conventional ones formed of metal materials, the first exemplary embodiment is capable of reducing time and work taken to obtain accurate position of the layer thickness restriction portion 36, is capable of substantially reducing the cause of metal powder being mixed, and is capable of achieving weight reduction of the device.

Other Exemplary Embodiments

Not limited to a two-component developer, the developer may be a single-component developer.

The development device is not limited to the development device 3 that is accommodated in the process cartridge. The development device may be implemented on a development device that is capable of being replaced by being independently attached/detached from the image forming device.

The image forming device is not limited to an image forming device employing a tandem intermediate transfer system. The present disclosure can be implemented on an image forming device of various types and configurations irrespective of whether it be a monochrome image forming device or a color image forming device as long as the image forming device is one provided with a development device or with a process cartridge.

According to the layer thickness restriction member of the present disclosure, the linearity of the center area of the layer thickness restriction portion in the rotational axis direction of the developer carrier is improved and homogenization of the distribution of the layer thickness in the rotational axis direction of the developer carried by the developer carrier is facilitated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-051908, filed Mar. 14, 2014, which is hereby incorporated by reference herein in its entirety.

What is claimed is:

1. A layer thickness restriction member that is disposed with respect to a developer bearing member, which bears a developer, with a gap between the layer thickness restriction member and the developer bearing member, and restricts an amount of developer on the developer bearing member, the layer thickness restriction member comprising:
   a base portion that extends in a longitudinal direction of the developer bearing member; and
   a layer thickness restriction portion that projects from the base surface, extends in the longitudinal direction of the developer bearing member, and restricts the amount of developer on the developer bearing member,
   wherein the base portion extends along a tangential direction of the developer bearing member at a position on the developer bearing member closest to the layer thickness restriction portion, and includes an upstream-side opposing portion, which is adjacent to the layer thickness restriction portion on an upstream side in a rotation direction of the developer bearing member and opposes the developer bearing member, and a downstream-side opposing portion, which is adjacent to the layer thickness restriction portion on a downstream side in the rotation direction of the developer bearing member and opposes the developer bearing member,
   wherein the layer thickness restriction member is integrally formed of resin by injection molding and comprises an injection portion through which the resin is injected to form the layer thickness restriction portion in the injection molding, wherein the injection portion is provided in just one position in the layer thickness restriction member where a distance of the one position from one end of the layer thickness restriction member in a longitudinal direction of the layer thickness restriction member is in a range of ten percent or more and under forty percent with respect to a full length of the layer thickness restriction member, and wherein the injection portion is provided on a side surface of the downstream-side opposing portion which is along the longitudinal direction of the developer bearing member.

2. The layer thickness restriction member according to claim 1, wherein the upstream-side opposing portion comprises a guide portion that guides a developer toward the layer thickness restriction portion.

3. The layer thickness restriction member according to claim 1, wherein the injection portion is located in a position, the distance of which from the one end of the layer thickness restriction member in the longitudinal direction of the layer thickness restriction member is in a range of ten percent or more and under thirty percent with respect to a full length of the layer thickness restriction member.

4. The layer thickness restriction member according to claim 1, further comprising a rib that is provided on a surface of the base portion opposite to the layer restriction portion and projects along the longitudinal direction of the developer bearing member.

5. The layer thickness restriction member according to claim 1, wherein a trace of the injection of the resin is left at the injection portion.

6. A method for manufacturing a layer thickness restriction member that restricts an amount of developer born by a developer bearing member and comprises a base portion that extends in a longitudinal direction of the developer bearing member and a layer thickness restriction portion that projects from the base portion, extends in the longitudinal direction of the developer bearing member, and restricts the amount of developer on the developer bearing member, wherein the base member extends along a tangential direction of the developer bearing member at a position on the developer bearing member closest to the layer thickness restriction portion, and includes an upstream-side opposing portion, which is adjacent to the layer thickness restriction portion on an upstream side in a rotation direction of the developer bearing member and opposes the developer bearing member, and a downstream-side opposing portion, which is adjacent to the layer thickness restriction portion on a downstream side in the rotation direction of the developer bearing member and opposes the developer bearing member, the method comprising:

setting a mold for forming the layer thickness restriction member; and injecting resin through an injection gate into the mold, wherein the injection gate is provided in just one position, the distance of which from the one end of the layer thickness restriction member in the longitudinal direction of the layer thickness restriction member is in a range of ten percent or more and under forty percent with respect to a full length of the layer thickness restriction member, and wherein the injection gate is opposed to a side surface of the downstream-side opposing portion which is along the longitudinal direction of the developer bearing member.

* * * * *